United States Patent
Huh et al.

(10) Patent No.: US 7,342,620 B2
(45) Date of Patent: Mar. 11, 2008

(54) COLOR FILTER ARRAY PANEL COMPRISING A BLUE PIXEL CONTRAST RATIO GREATER THAN TWICE THE RED PIXEL CONTRAST RATIO AND LIQUID CRYSTAL DISPLAY INCLUDING THE SAME

(75) Inventors: Chul Huh, Yongin-si (KR); Kwang-Ho Kim, Anyang-si (KR); Byoung-Joo Kim, Annyang-si (KR); Sang-Hun Lee, Cheonan-si (KR)

(73) Assignee: Samsung Electronics Co., Ltd. (KR)

( * ) Notice: Subject to any disclaimer, the term of this patent is extended or adjusted under 35 U.S.C. 154(b) by 87 days.

(21) Appl. No.: 10/882,404

(22) Filed: Jul. 2, 2004

(65) Prior Publication Data
US 2005/0030448 A1 Feb. 10, 2005

(30) Foreign Application Priority Data
Jul. 2, 2003 (KR) .................... 10-2003-0044578

(51) Int. Cl.
*G02F 1/1335* (2006.01)
*G03F 1/00* (2006.01)
(52) U.S. Cl. .......................................... 349/106; 430/7
(58) Field of Classification Search ..................... None
See application file for complete search history.

(56) References Cited

U.S. PATENT DOCUMENTS

| 4,984,874 A | * | 1/1991 | Yamamoto et al. | ......... 349/119 |
| 5,523,340 A | * | 6/1996 | Niu et al. | ...................... 524/88 |
| 6,255,130 B1 | * | 7/2001 | Kim | ............................ 438/30 |
| 2003/0156242 A1 | * | 8/2003 | Kim et al. | .................. 349/129 |

FOREIGN PATENT DOCUMENTS

JP  2001033616 A  *  2/2001
JP  2001194658 A  *  7/2001

OTHER PUBLICATIONS

Machine translated copy of JP 2001-194658.*

* cited by examiner

*Primary Examiner*—Andrew Schechter
*Assistant Examiner*—W. Patty Chen
(74) *Attorney, Agent, or Firm*—Cantor Colburn LLP (57) ABSTRACT

In a color filter array panel that includes a plurality of red, green and blue color filters for a plurality of red, green and blue pixels, respectively, the blue pixels have a higher contrast ratio than the red pixels and the green pixels. A liquid crystal display utilizing the color filter array panel may be used as a monitor and as a television set as it meets the required display characteristics of both.

17 Claims, 6 Drawing Sheets

Fig. 1

|  | Monitor | TV |
|---|---|---|
| Reproductivity (NTSC) | 60 – 65 % | 72 % |
| Ry | 0.345 | 0.330 |
| By | 0.100 | 0.060 |
| Color Temp. | 6,500 | 10,000 |

Fig. 4

|  | CR | | | Characteristics (Dark) | | |
|---|---|---|---|---|---|---|
|  | B | G | R | y | x | Color Temp. (°K) |
| Exp. 1 | 1,200 | 700 | 500 | 0.281 | 0.283 | 10,284 |
| Exp. 2 | 1,000 | 500 | 500 | 0.284 | 0.285 | 9,808 |
| Exp. 3 | 500 | 700 | 500 | 0.252 | 0.256 | 22,927 |
| Exp. 4 | 500 | 700 | 700 | 0.242 | 0.254 | 32,028 |

COLOR FILTER ARRAY PANEL COMPRISING A BLUE PIXEL CONTRAST RATIO GREATER THAN TWICE THE RED PIXEL CONTRAST RATIO AND LIQUID CRYSTAL DISPLAY INCLUDING THE SAME

This application claims the benefit of Korean Patent Application No. 2003-0044578, filed on Jul. 2, 2003, which is hereby incorporated by reference for all purposes as if fully set forth herein.

BACKGROUND OF THE INVENTION

1. Field of the Invention

The present invention relates to a color filter array panel and a liquid crystal display including the same.

2. Discussion of Related Art

Liquid crystal displays (LCDs) are one of the most widely used flat panel displays. Generally, an LCD includes two panels having field-generating electrodes with a liquid crystal (LC) layer filled in a gap therebetween. The LCD displays images by applying voltages to the field-generating electrodes to generate an electric field in the LC layer, which determines orientations of LC molecules to adjust polarization of incident light.

The LCD includes a plurality of pixels arranged in a matrix and a plurality of signal lines for driving the pixels, including gate lines for transmitting scanning signals and data lines for transmitting data signals. Each pixel includes a pixel electrode, a color filter, and a thin film transistor (TFT) connected to the gate lines and the data lines.

One of the LCD panels, a TFT array panel, includes the gate lines, the data lines, the pixel electrodes, and the TFTs. The other panel includes color filters for color representation.

An LCD may be used as a monitor or a TV (television) set. However, an LCD used as a monitor may not be used as a TV since the color reproductivity of a TV display device usually follows an European Broadcasting Union (EBU) standard, which requires higher color reproductivity than that for a monitor.

Increasing color filter thickness to increase color reproductivity has been suggested in order to use an LCD monitor as a TV. However, the LCD monitor color reproductivity based on the National Television System Committee (NTSC) system does not meet the EBU standard and Commission Internationale de l'Eclairage (CIE) color coordinates for blue and red colors.

Figure 1:
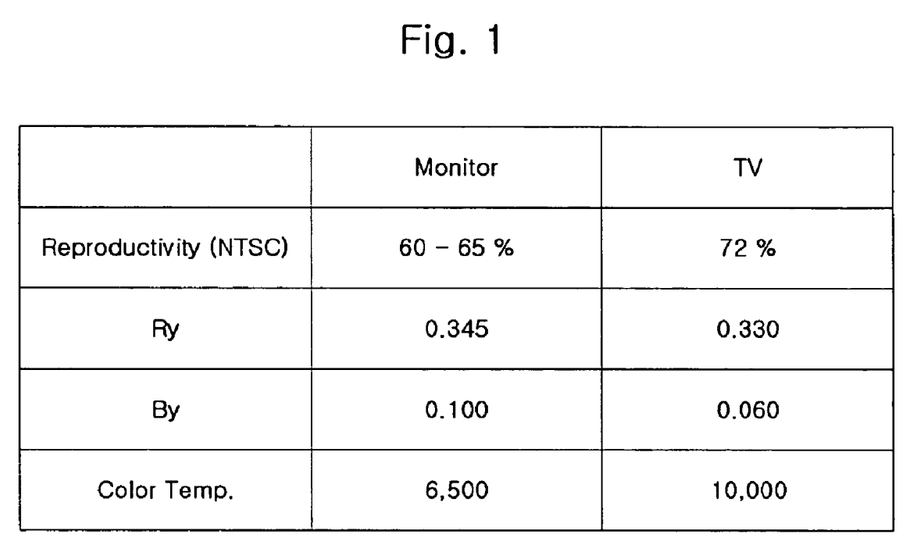
FIG. 1 shows required monitor and TV display characteristics.

An LCD for TV satisfying the EBU standard was recently developed by adjusting a mixing ratio of color filter pigments. FIG. 1 shows required monitor and TV display characteristics. An LCD for monitor shows the color reproductivity equal to about 60-65% of the NTSC standard, red and blue color coordinates Ry and By in Y axis equal to about 0.345 and 0.100, respectively, and a measured color temperature of about 6,500° K. On the other hand, the LCD for TV with adjusted pigment mixing ratios shows the color reproductivity equal to about 72% of the NTSC standard, red and blue color coordinates Ry and By in Y axis equal to about 0.330 and 0.060, and a measured color temperature of about 10,000° K.

However, the LCD for TV becomes black bluish when displaying dark images.

SUMMARY OF THE INVENTION

Accordingly, the present invention is directed to a color filter array panel and an LCD including the same that substantially enhances the color reproductivity. This present invention also provides a method for manufacturing liquid crystal display color filters.

Additional features of the invention will be set forth in the description which follows, and in part will be apparent from the description, or may be learned by practice of the invention.

The present invention discloses, a color filter array panel, comprised of a plurality of red, green and blue color filters for a plurality of red, green and blue pixels. The blue pixels have a higher contrast ratio than the red pixels and the green pixels.

This present invention also discloses an LCD, comprising a first substrate, a second substrate, and a liquid crystal layer interposed between the first substrate and the second substrate. The second substrate is further comprised of a plurality of red, green and blue color filters for a plurality of red, green and blue pixels, respectively. The blue pixels have a contrast ratio higher than any other colored pixels.

This present invention also discloses a method for manufacturing liquid crystal display color filters including the steps of providing an insulating substrate with a plurality of light blocking members, and coating a photosensitive film containing red, green or blue pigments on the insulating substrate and light blocking members. The photosensitive film is exposed to develop a group of color filters. The step of coating a photosensitive film includes coating blue pigments utilizing blue pigment particles of the average size of 120-180 nm.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

DETAILED DESCRIPTION OF EMBODIMENTS

Reference will now be made in detail to an embodiment of the present invention, example of which is illustrated in the accompanying drawings. In the drawings, the thickness of layers, films and regions are exaggerated for clarity. Like numerals refer to like elements throughout. When an element such as a layer, film, region or substrate is referred to as being "on" another element, it should be understood that the element may be directly on the other element or intervening elements may also be present. In contrast, when an element is referred to as being "directly on" another element, there are no intervening elements present.

Figure 2:
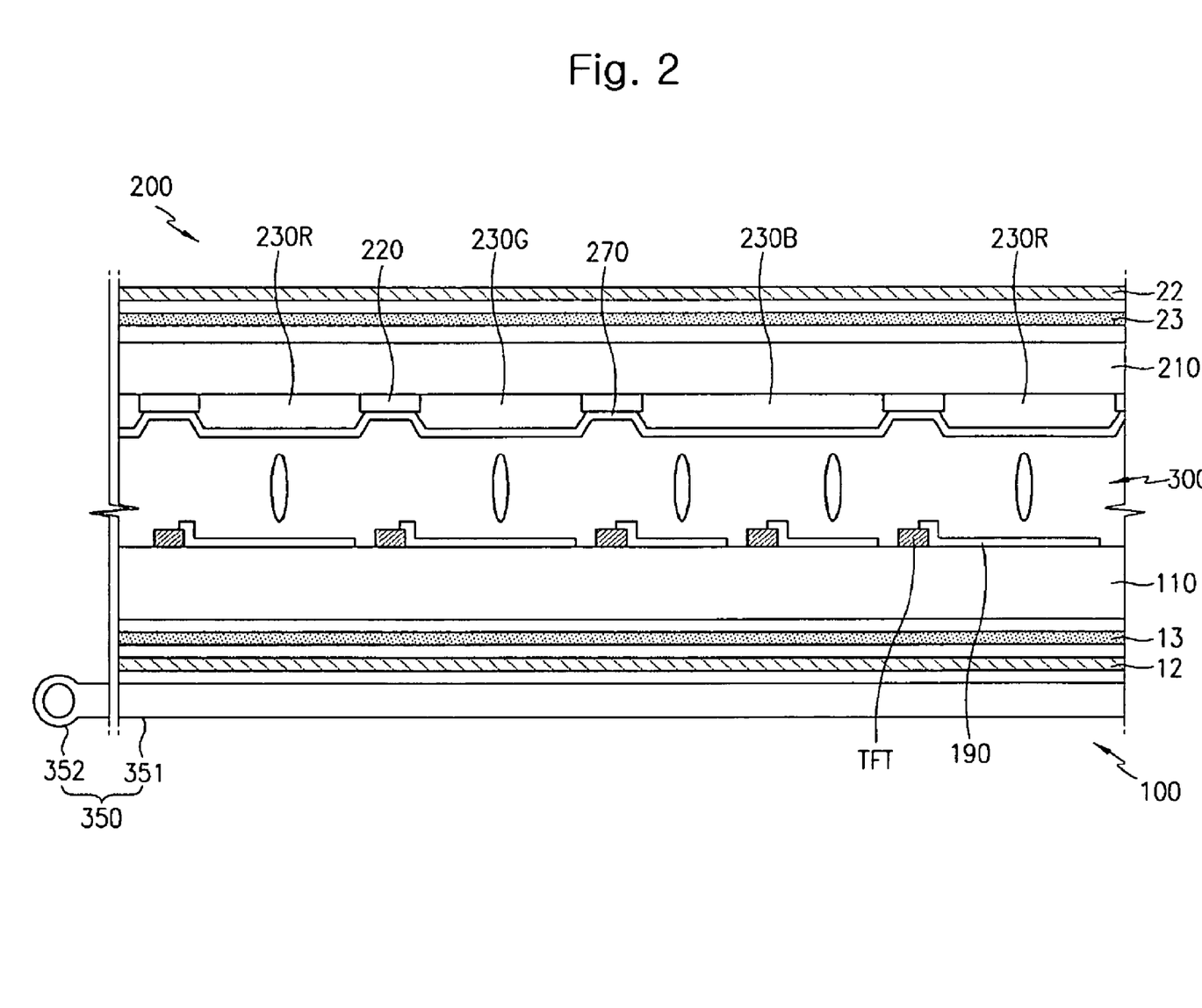
FIG. 2 shows an LCD according to an exemplary embodiment of the present invention.

FIG. 2 shows an LCD according to an exemplary embodiment of the present invention.

An LCD according to this exemplary embodiment includes a lower panel 100, an upper panel 200 facing the lower panel 100, a liquid crystal (LC) layer 300 interposed therebetween, lower polarizer 12 and upper polarizer 22, lower compensation film 13 and upper compensation film 23, and a backlight unit 350. The LC layer 300 contains a plurality of LC molecules having predetermined orientations. The LC molecules' orientations change depending on electric field strength, and the molecular orientations determine incident light transmittance. The transmissive axes of the polarizers 12 and 22 are crossed or parallel. They are preferably crossed when the LC molecules are homeotropically aligned such that they almost completely block the incident light in absence of an electric field, which improves contrast ratio. The backlight unit includes a lamp unit 352 for emitting light and an optical sheet unit 351 for guiding and spreading the light from the lamp unit. The optical sheet unit 351 is disposed under the TFT array panel 100, and the lamp unit 352 is disposed at the side of the optical sheet unit 351. However, the lamp unit 352 may be disposed under the TFT array panel 100.

The lower panel 100 includes a lower substrate 110 preferably made of transparent insulating material such as glass, a plurality of TFTs formed on an inner surface of the substrate 110, and a plurality of pixel electrodes 190 connected to the TFTs. The pixel electrodes 190 are preferably made of transparent conductive material such as indium tin oxide (ITO) and indium zinc oxide (IZO). The TFTs switch data voltages to be applied to the pixel electrodes 190.

The upper panel 200 includes an upper substrate 210 preferably made of transparent insulating material such as glass, a light blocking member 220 (known as black matrix) for defining a matrix of pixel areas, and a common electrode 270 preferably made of transparent conductive material such as ITO or IZO. A plurality of red, green and blue color filters 230R, 230G and 230B are disposed in the pixel areas.

Figure 6:
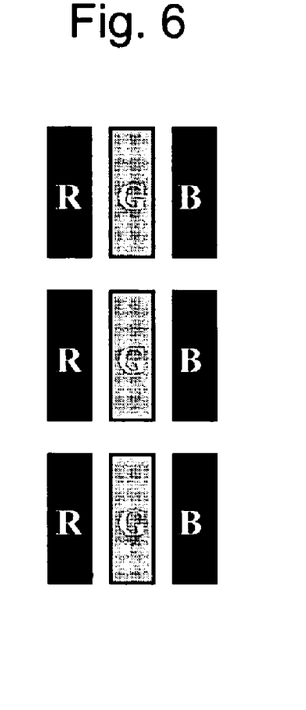
FIG. 6 shows color filters arranged in a stripe arrangement.
Figure 7:
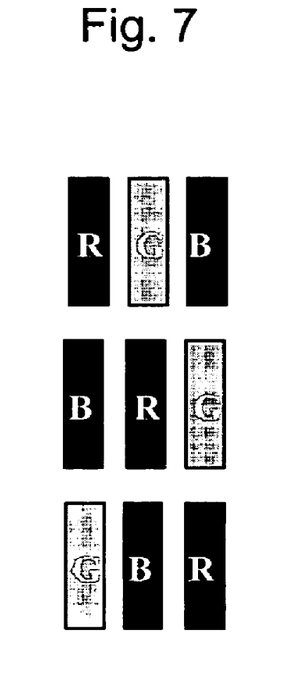
FIG. 7 shows color filters arranged in a mosaic arrangement.
Figure 8:
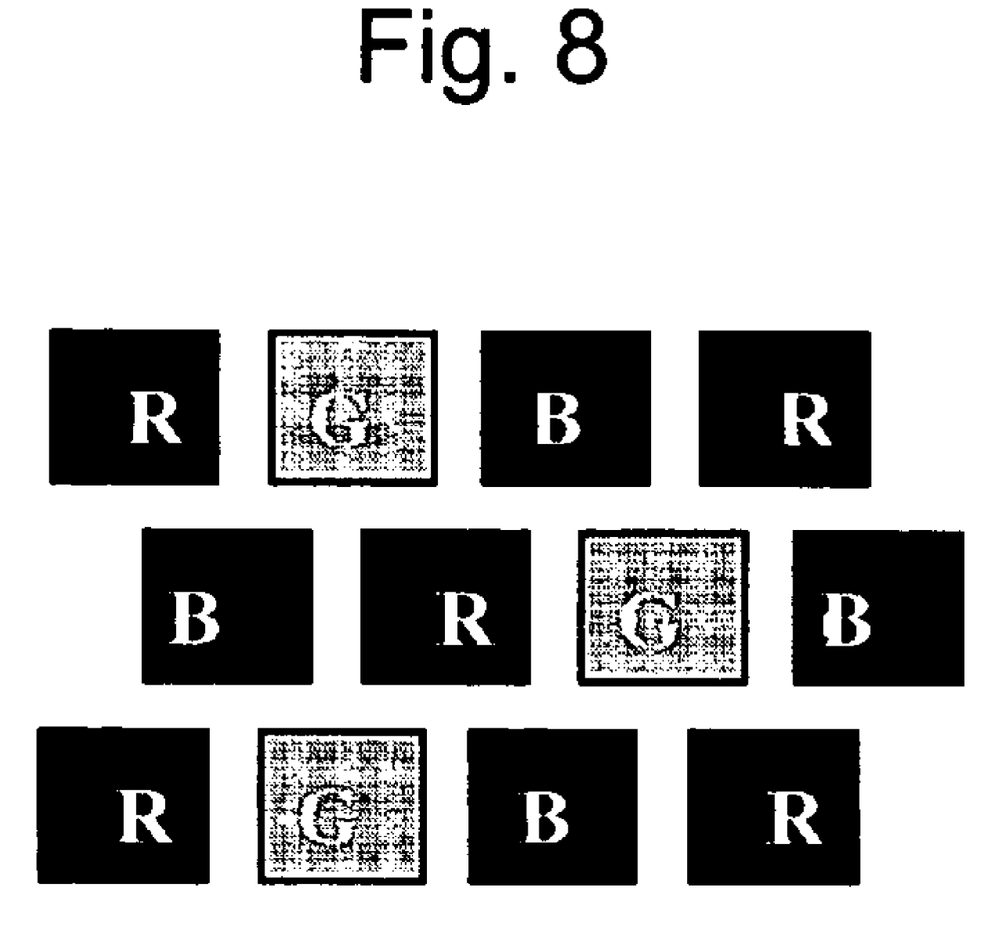
FIG. 8 shows color filters arranged in a delta arrangement.

The color filters 230R, 230G and 230B may be arranged in a sequential and periodical manner, including a stripe arrangement, a mosaic arrangement, and a delta or triad arrangement. In the stripe arrangement as shown in FIG. 6, each column includes the color filters 230R, 230G and 230B representing the same color and each row includes the red, green and blue color filters 230R, 230G and 230B arranged in turn. In the mosaic arrangement as shown in FIG. 7, the color filters 230R, 230G and 230B are arranged in turn in the row and column direction. In the delta arrangement as shown in FIG. 8, the color filters 230R, 230G and 230B are arranged in turn in the row direction, but they are obliquely arranged in a zigzag formation in the column direction. The delta arrangement is advantageous for representing circle or oblique lines.

A pixel is formed by an LC capacitor, a TFT connected to a pixel electrode 190, and a color filter 230R, 230G or 230B, where the LC capacitor includes a pixel electrode 190, a common electrode 270, and a region of the LC layer 300 disposed on the pixel electrode 190. Red, green and blue pixels are referred to as RP, GP and BP, respectively.

The blue pixels BP have a higher contrast ratio than the red and green pixels RP and GP so that the LCD satisfies the EBU standard for TV and the dark bluish phenomenon is removed when displaying dark images. The contrast ratio of the blue pixels BP is preferably higher than about 1,000. More preferably, it may be higher than 1,200 and larger than twice that of the red pixels RP. The high contrast ratio may be easily realized by minimizing incident light transmittance in a dark state rather than by maximizing the light transmittance in a white state.

Colored pigment particles in the color filters 230R, 230G and 230B transmit light having a predetermined wavelength while absorbing light having other wavelengths. Light passing through the color filters 230R, 230G and 230B may be reflected or scattered by the pigment particles to be phase-shifted, and therefore it may be leaked in a dark state, which raises the light transmittance in the black state and decreases the contrast ratio. Reflection or scattering may be reduced by reducing pigment particle size. Accordingly, the contrast ratio of the blue pixels BP may be raised by using blue pigment particles having a size smaller than the wavelength of blue light. Hence, the average size of the blue pigment particles in the blue color filters 230B may be equal to about 120-180 nm so that they minimally change the phase of the blue light. For example, blue light passing through a blue color filter of an LCD having a crossed polarizer and analyzer does not experience a phase shift. Therefore, the blue light reaching the analyzer has a phase nearly equal to that of the blue light right after passing through the polarizer, and it is nearly completely blocked by the analyzer. Accordingly, the dark bluish phenomenon is removed.

Next, an LCD according to another exemplary embodiment of the present invention is described in detail with reference to FIG. 3, which shows a patterned vertically aligned (PVA) mode LCD according to an exemplary embodiment of the present invention.

An LCD according to this exemplary embodiment includes a TFT array panel 100, a color filter array panel 200 facing the TFT array panel 100, and an LC layer 300 interposed therebetween. The LC layer 300 contains a plurality of LC molecules vertically aligned to panel surfaces 100 and 200. The LCD further includes a pair of crossed polarizers (not shown), compensation films (not shown), and a backlight unit (not shown).

The color filter array panel 200 includes an upper substrate 210 preferably made of transparent insulating material such as glass, a light blocking member 220 (known as black matrix) for defining a matrix of pixel areas, and a common electrode 270 preferably made of transparent conductive material such as ITO or IZO. A plurality of red, green and blue color filters 230R, 230G and 230B with an overcoat 250 formed thereon are disposed in the pixel areas.

Regarding the TFT array panel 100, a plurality of gate electrodes 123 are formed on an insulating substrate 110, which is preferably made of a transparent insulating material such as glass, and a gate insulating layer 140 is formed thereon. A plurality of semiconductors 154 and a plurality of ohmic contacts 163 and 165 are sequentially formed on the gate insulating layer 140, and a plurality of source and drain electrodes 173 and 175 are formed thereon. A passivation layer 180 having a plurality of contact holes 183 is formed on the source and drain electrodes 173 and 175, and a plurality of pixel electrodes 190, preferably made of transparent conductive material such as ITO and IZO, are formed on the passivation layer 180. The pixel electrodes 190 are connected to the drain electrodes 175 through the contact holes 183. A gate electrode 123, a source electrode 173, a drain electrode 175 and a semiconductor 154 form a TFT.

The TFT array panel 100 may further include a plurality of gate lines connected to the gate electrodes 123 for transmitting scanning signals and a plurality of data lines connected to the source electrodes 173 for transmitting data voltages.

The pixel electrodes 190 and the common electrode 270 have a plurality of cutouts 191 and 271 that control the tilt directions of the LC molecules in the LC layer 300. That is, the LC molecules in each region defined by adjacent cutouts 191 and 271, or by the cutout 191 and 271 and an edge of the pixel electrode 190, are tilted in a direction perpendicular to the extension direction of the cutouts 191 and 271 in response to the application of an electric field. Therefore, the LC molecules have various tilt directions, which improves viewing angle.

The TFT array panel 100 may be manufactured by several photolithography and etch steps, with preferably four or five photolithography steps. If five steps are used, those photolithography steps include forming the gate electrodes 123, the semiconductors 154 and the ohmic contacts 163 and 165, the source and drain electrodes 173 and 175, the passivation layer 180 and the gate insulating layer 140, and the pixel electrodes 190. However, if four steps are used, the semiconductors 154, the ohmic contacts 163 and 165, and the source and the drain electrodes 173 and 175 are formed by one photolithography step. In this case, the semiconductors 154, the ohmic contacts 163 and 165, and the source and the drain electrodes 173 and 175 have substantially the same planar shape except for portions between the source and drain electrodes 173 and 175. The details of forming a thin film transistor (TFT) array panel in four steps are fully disclosed in U.S. Pat. No. 6,255,130 assigned to the same assignee of the present invention, which is incorporated by reference in its entirety.

The color filters 230R, 230G and 230B in the color filter array panel 200 are also formed by photolithography. A photosensitive film (not shown) containing one of red, green and blue pigments was coated on the insulating substrate 210 provided with the light blocking member 210, exposed to light through a mask (not shown) and developed to form a plurality of a first group of color filters 230R, 230G and 230B representing one of the red, green and blue colors. The remaining two groups of color filters were formed by similar procedures.

Figure 3:
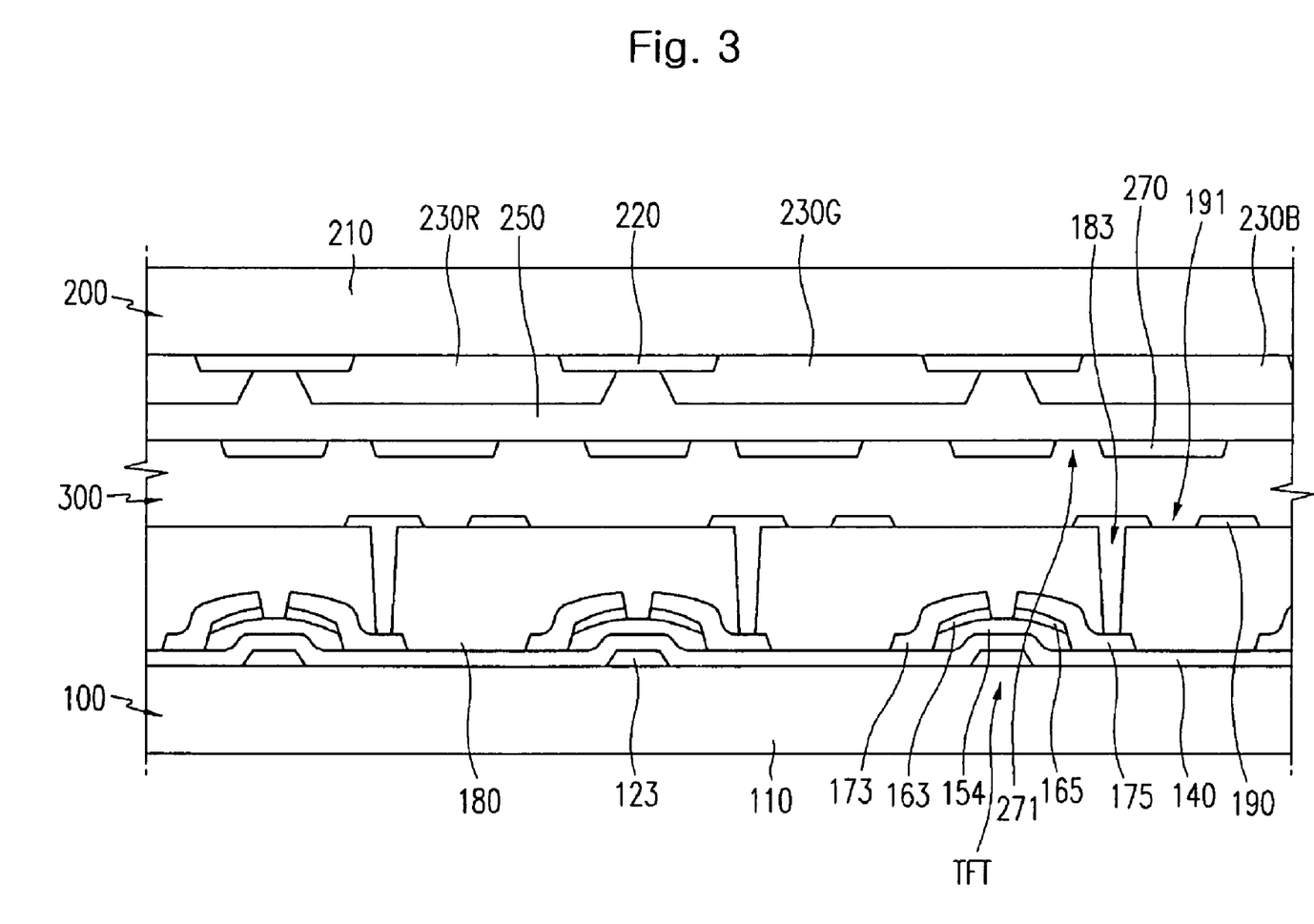
FIG. 3 shows a patterned vertically aligned (PVA) mode LCD according to an exemplary embodiment of the present invention.

A 32" PVA LCD for TV shown in FIG. 3 was manufactured as described above, and various characteristics of the LCD such as color coordinates and color temperature were measured. These characteristics are described below in detail with reference to FIGS. 4 and 5.

Figure 4:
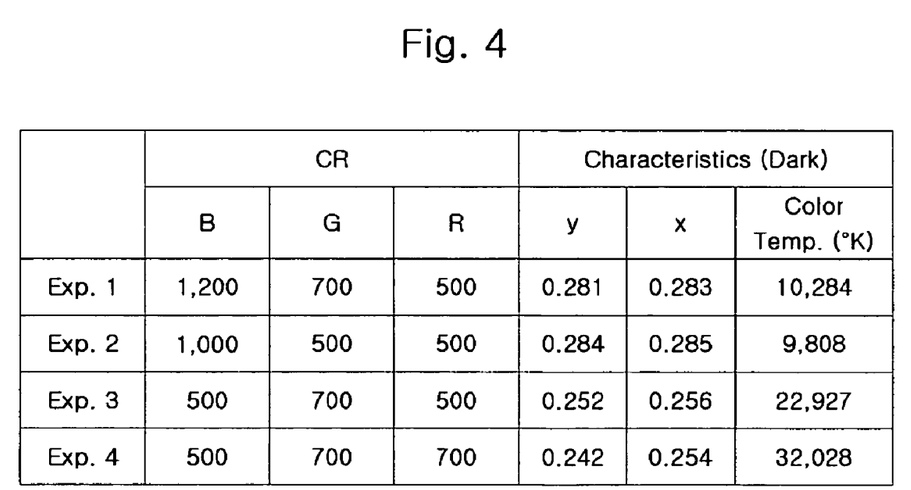
FIG. 4 shows characteristics of the LCD of FIG. 3 for various contrast ratios.
Figure 5:
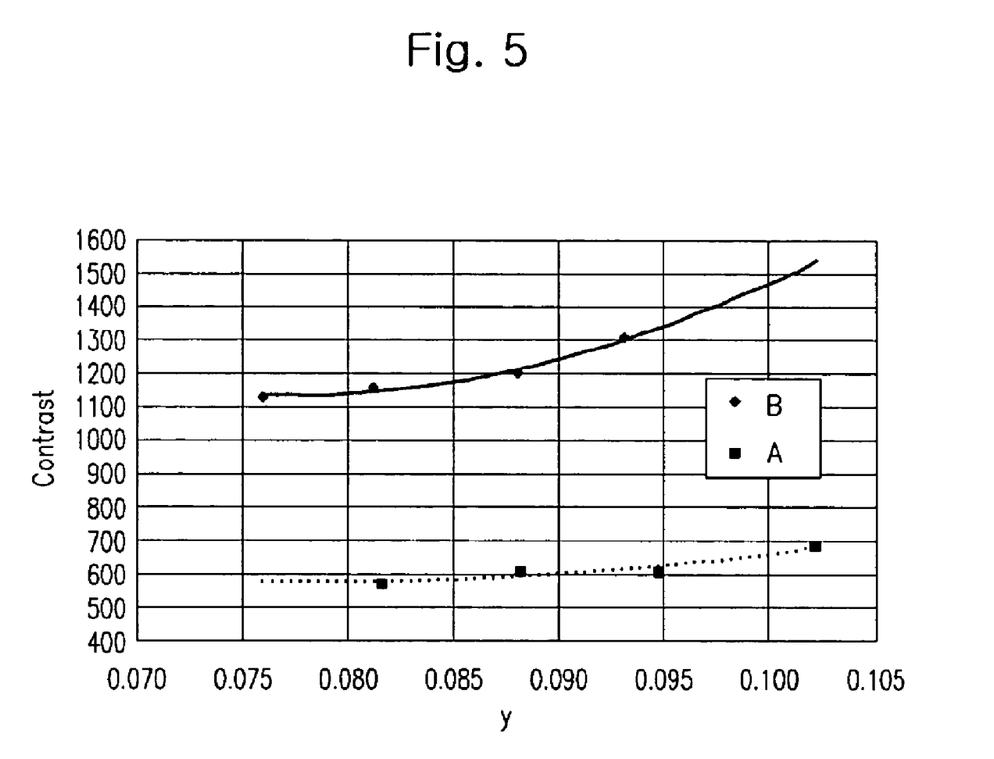
FIG. 5 shows the contrast ratio as function of a color coordinate for the LCD of FIG. 3.

FIG. 4 shows characteristics of the LCD shown in FIG. 3 for various contrast ratios, and FIG. 5 shows the contrast ratio as a function of a color coordinate.

Referring to FIG. 4, color coordinates x and y and color temperature were measured for the contrast ratios of 500, 1,100 and 1,200 of the blue pixels BP when the contrast ratio of the red and the green pixels RP and GP was equal to either 500 or 700.

For the contrast ratios of 1,100 and 1,200 of the blue pixels BP, the color coordinates x and y in a dark state were about 0.281-0.285 and the color temperature was about 9,000-11,000° K. However, for the contrast ratio of 500 of the blue pixels BP, the color coordinates x and y in the dark state were about 0.242-0.256, which shows a dark bluish phenomenon, and the color temperature was about 22,000-32,000° K., which also is shows a dark bluish phenomenon.

Referring to FIG. 5, the color coordinate y was measured as function of the contrast ratio of the blue pixels BP. The character "A" represents a case including conventional blue pixels BP with a contrast ratio of 500-700, and the character "B" represents a case including blue pixels BP with a contrast ratio higher than 1,100 according to an exemplary embodiment of the present invention.

As shown in FIG. 5, when the conventional blue pixels B have a contrast ratio of 500-700, the color coordinate y is equal to 0.075-0.105. On the other hand, when the blue pixels A have a contrast ratio of about 1,100-1,200, the color coordinate y is about 0.075-0.090. In addition, when the contrast ratio of the blue pixels A was higher than about 1,300, the color coordinate y was increased, and the obtained contrast ratio of the blue pixels about 1,400 for the color coordinate y lower than 0.105.

As described above, the LCD including the blue pixels having the contrast ratio higher than other pixels according to exemplary embodiments of the present invention shows excellent color reproductivity satisfying the EBU standard. Thus it is suitable for the use in TV.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

For example, the color filters may be disposed on the TFT array panel, particularly between the TFTs and the passivation layer.

What is claimed is:

1. A color filter array panel, comprising:
   a red filter for a red pixel; a green filter for a green pixel; and a blue filter for a blue pixel;
   wherein the blue pixel shows a higher contrast ratio than the red pixel and the green pixel,
   wherein the blue pixel contrast ratio is greater than twice the red pixel contrast ratio.

2. The color filter array panel of claim 1, wherein the blue pixel contrast ratio is greater than 1,000.

3. The color filter array panel of claim 2, wherein the blue pixel contrast ratio is greater than 1,200.

4. The color filter array panel of claim 1, wherein average size of pigment particles in the blue color filter is about 120-180 nm.

5. A liquid crystal display (LCD), comprising:
   a first substrate,
   a second substrate,
   a liquid crystal layer interposed between the first substrate and the second substrate,
   wherein the second substrate further comprises:
   a red filter for a red pixel;
   a green filter for a green pixel; and
   a blue filter for a blue pixel;
      wherein the blue pixel has a contrast ratio higher than any other colored pixels,
      wherein the blue pixel contrast ratio is greater than twice the red pixel contrast ratio.

6. The LCD of claim 5, wherein the blue pixel contrast ratio is greater than 1,000.

7. The LCD of claim 5, wherein the average size of the pigment particles in the blue color filters is about 120-180 nm.

8. The LCD of claim 5, wherein the LCD is a patterned vertically aligned LCD.

9. A method of manufacturing liquid crystal display color filters, comprising the steps of:
   coating a layer containing red, green and blue pigments on an insulating substrate; and
   patterning the layer to form a respective red, green and blue color filter,
   wherein the blue pigments have an average particle size of 120-180 nm and smaller than an average particle size of the red and green pigments,
   wherein the blue pixel contrast ratio is greater than twice the red pixel contrast ratio.

10. The method of claim 9, wherein the layer is a photosensitive film.

11. The method of claim 9, wherein the insulating substrate is a color filter substrate.

12. The method of claim 9, wherein the insulating substrate is a thin film transistor array substrate.

13. A method for manufacturing a liquid crystal display, comprising:
   forming a thin film transistor array substrate; and
   forming a color filter layer comprising red, green and blue pigments,
   wherein the blue pigments have average particle size of 120-180 nm and smaller than an average particle size of the red and green pigments,
   wherein the blue pixel contrast ratio is greater than twice the red pixel contrast ratio.

14. The method of claim 13, wherein the thin film transistor array substrate is formed by photolithography using four masks.

15. The method of claim 14, wherein the color filter layer is formed on the thin film transistor array substrate.

16. The method of claim 14, wherein the color filter layer is formed on a substrate other than the thin film transistor array substrate.

17. The method of claim 13, wherein a blue pixel contrast ratio is greater than 1,000.

* * * * *